Patented Feb. 15, 1927.

1,617,696

UNITED STATES PATENT OFFICE.

EDSON R. WOLCOTT, OF LOS ANGELES, CALIFORNIA, ASSIGNOR TO THE TEXAS COMPANY, OF NEW YORK, N. Y., A CORPORATION OF TEXAS.

ART OF MANUFACTURE OF ALUMINUM CHLORIDE.

No Drawing. Application filed September 22, 1921. Serial No. 502,499.

This invention relates to the production of aluminum chloride from clay, bauxite, or other aluminum containing material, by heating such material in the presence of chlorine and a reducing agent, such as carbon, so as to cause aluminum chloride to be produced and volatilized. In such an operation it has been found difficult to obtain a retort suitable for carrying out the heating and distilling operation. It is not practicable to use iron, or other metals, for this purpose as such metals are attacked by the chlorine at the temperature of the operation. Retorts made of fire-clay are slowly attacked and deteriorated by the heat and reagents used, and are also objectionable in that there is considerable loss of aluminum chloride, apparently by penetration of the volatilized aluminum chloride into or through the walls of the retort, these disadvantages being due to the porous nature of the fire-clay. In order to overcome deterioration of the retort and to carry out the aluminum chloride distillation with minimum loss, I have found it desirable to seal or lute the clay or other retort in which the distillation is carried on in the manner hereinafter described.

My invention may be carried out in the following manner:

A retort of fire-clay, or similar material, is first lined, or coated internally with a material forming an impervious coating, that is to say a coating which is impervious to aluminum chloride at the temperature of operation of the retort. A suitable material for this purpose consists of a mixture of clay and an alkali, or alkaline silicate, and water mixed to form a paste or plastic mass, which is applied to the inside walls of the retort so as to completely cover the same, this coating being then dried and subsequently baked, either during the distilling operation by the heat applied to the retort during such operation, or, if desired, it can be baked as a preliminary operation before the retort is charged.

A suitable composition for forming the impervious lining may be made by taking about 56% clay, about 25% water and about 19% sodium silicate having a ratio of $SiO_2$ to $Na_2O$ of approximately 3 to 1. The ingredients are mixed together to form a plastic mass which upon analysis is found to have approximately the following composition:

| | Per cent. |
|---|---|
| $Al_2O_3$ | 20 |
| $Na_2O$ | 5 |
| $SiO_2$ | 50 |
| $H_2O$ | 25 |

It will be understood, however, that the proportions herein given are only by way of an example, and may be considerably varied as long as the resulting product forms a lining for the retort which is impervious to the vapors of aluminum chloride under the conditions of operation of the retort.

The retort lined as above described is charged with aluminum compound, for example, clay, bauxite, or other oxygen containing compound of aluminum, carbon also being introduced and intimately mixed with the aluminum containing material. Such mixture may be effected by grinding clay, bauxite, etc., with coke, or other form of carbon, or by grinding such aluminum containing material with coal and heating the same to distill off volatile hydrocarbons, or by introducing into the retort an intimate mixture of clay, or other aluminum containing material, and carbonaceous material, such, for example, as a carbonaceous shale, oil shale, etc., and then subjecting the retort to heat to distill off volatile hydrocarbons, leaving residual carbon intimately mixed with the aluminum containing compound. Chlorine is then passed into the retort, which is heated externally, or otherwise, to a sufficiently high temperature, say from 800° to 1000° C., and for a sufficient time to effect the production and volatilization of aluminum chloride, which passes off from the retort and is conducted to suitable condensing and collecting means. In this operation the impervious lining, or interior coating of the retort prevents loss of aluminum chloride which would otherwise occur and insures that substantially all of the aluminum chloride produced can be condensed and collected. There will, in general, however, be some deterioration of the lining by action of the chlorine and aluminum chloride thereon, so that it will be necessary to reline the retort after a certain number of distilling operations therein but by relining the retort with the impervious coating as above described with sufficient frequency, it is possible to maintain the retort in effective working condition so as to substantially obviate the loss of aluminum chloride by absorption or leakage thereof in the walls of the retort.

My invention is applicable in connection with the use of retorts molded of fire-clay, or built up with fire-clay bricks, and also to retorts molded or built up of other refractory material presenting similar conditions as to porosity, either in the body of the material itself, or in the joints between the bricks of the structure. In any of these cases my invention contemplates the application to the walls of the retort of a lining or luting which is impervious to the chlorine and aluminum chloride vapors at the temperature of operation of the furnace.

What I claim is:

A composition adapted for lining aluminum chloride retorts comprising a mixture of clay and an alkali metal silicate having approximately the following analysis:

|  | Per cent. |
|---|---|
| $Al_2O_3$ | 20 |
| $Na_2O$ | 5 |
| $SiO_2$ | 50 |
| $H_2O$ | 25 |

In testimony whereof I have hereunto subscribed my name this 12th day of September, 1921.

EDSON RAY WOLCOTT.